United States Patent [19]

Baker

[11] Patent Number: 4,635,892

[45] Date of Patent: Jan. 13, 1987

[54] ACTIVE VIBRATION SUPPRESSOR

[75] Inventor: E. Bruce Baker, Altamonte Springs, Fla.

[73] Assignee: Vibrastop, Inc., Altamonte Springs, Fla.

[21] Appl. No.: 766,796

[22] Filed: Aug. 19, 1985

[51] Int. Cl.$^4$ .............................................. F16M 13/00
[52] U.S. Cl. ..................... 248/550; 52/167; 248/559
[58] Field of Search ............... 248/559, 550, 659, 636, 248/562, 563; 267/140.1, 80, 141.2, 141.3, 137, 275, 298; 188/379, 380, 378; 52/167

[56] References Cited

U.S. PATENT DOCUMENTS

| | | | |
|---|---|---|---|
| 2,777,544 | 1/1957 | O'Connor | 188/378 |
| 3,464,657 | 9/1969 | Bullard | 248/550 |
| 3,483,951 | 12/1969 | Bonesho et al. | 188/379 |
| 3,566,993 | 3/1971 | Leatherwood | 188/379 |
| 3,603,233 | 9/1971 | Scharton et al. | 248/550 |
| 3,635,427 | 1/1972 | Balke | 248/550 X |
| 3,690,607 | 9/1972 | Mard | 248/550 |
| 3,703,999 | 11/1972 | Louis et al. | 248/550 |
| 3,917,246 | 11/1975 | Gartner | 188/378 X |
| 3,952,979 | 4/1976 | Hansen | 248/550 |
| 4,033,541 | 7/1977 | Malveg | 248/550 |
| 4,101,009 | 7/1978 | Hehl et al. | 267/137 X |
| 4,477,045 | 10/1984 | Karasawa et al. | 248/550 X |
| 4,483,425 | 11/1984 | Newman | 248/550 X |
| 4,511,114 | 4/1985 | Cawley | 248/550 |
| 4,514,942 | 5/1985 | Pocanschi | 52/167 |
| 4,546,960 | 10/1985 | Abrams et al. | 248/559 X |

Primary Examiner—J. Franklin Foss
Attorney, Agent, or Firm—Macdonald J. Wiggins

[57] ABSTRACT

An active vibration suppressor for suppressing vibrations in structures, such as buildings, has an actuator attached to the structure and an extendable rod of the actuator attached to a seismic mass which is thus moved by the actuator. A sensor is attached to the structure adjacent to the actuator and connected to a compensated power amplifier which operates the actuator. Movement of the structure is sensed and the actuator moves the seismic mass in a direction to oppose the structural displacement thereby minimizing structural vibrations.

21 Claims, 14 Drawing Figures

ACTIVE VIBRATION SUPPRESSOR

BACKGROUND OF THE INVENTION

1. Field of the Invention

The present invention relates to vibration suppressors and more particularly to an active suppressor for supressing vibrations in structures such as buildings.

2. Description of the Prior Art

The use of passive and active vibration dampeners for controlling vibrations is well known in the art. In a passive vibration dampening system, it is common to utilize a seismic mass coupled to the structure by a spring in parallel with a damper. However, in this type of suppressor, the disturbing frequency must be very nearly constant if the effective mass is to be kept small. When the disturbing frequency is not constant, additional mass must be added which may be essentially equal to the structural mass. There have been a number of approaches to vibration suppression using active elements that have proved suitable for control of the vibration of flexible bodies. For example, in U.S. Pat. No. 3,566,993 to Leatherwood et al, an amplified active system is disclosed. The system moves the housing of a device, flexibly attached to the housing, in a direction opposite to a sensed movement of the device. However, this approach is not suitable for a structure such as a building. Hehl et al in U.S. Pat. No. 4,101,009 teach absorbing oscillations between a frame and a continuously oscillating mass by making the mass system and its drive means operate in a manner to produce out of phase motion of the frame and the mass. Other U.S. patents concerned with vibration suppression or absorption include U.S. Pat. No. 3,917,246 to Gartner et al; U.S. Pat. No. 2,777,544 to O'Connor; and U.S. Pat. No. 3,483,951 to Bonesho et al. However, none of these approaches are suitable to suppress vibrations in commercial buildings.

In the design of commercial buildings, it is apparently very difficult for the design architects and engineers to foresee vibration problems. In buildings in which heavy vehicles are required to operate, it is found that the movements of such vehicles produce very disturbing vibrations throughout floors, walls, and ceilings of the buildings. In the past, the approach to reducing building and structural vibration has been to alter the structure or to add additional structural elements such as posts, columns, and the like, all of which are expensive and may interfere with the use of the building. Therefore, there is a need for an active vibration suppression means which can be added to an existing building without significant structural alterations thereto.

SUMMARY OF THE INVENTION

The present invention is a dynamic vibration suppressor utilizing a servo controlled force generator which funtions to produce a zero motion at a control point. The apparatus comprises three main elements: an actuator; a sensor; and a seismic mass. The sensor may be an accelerometer although either a velocity or position sensor may also be used. The actuator may be operated by hydraulics, pneumatics, or by electricity. The sensor is mounted to the structure at a point experiencing vibration. One end of the actuator is attached to a seismic mass and the other end is connected to the structure adjacent the point at which the sensor is attached.

The output of the sensor is applied to a preamplifier whose output drives a compensation network which conditions a signal based upon the type of sensor and the particular parameters of the system. The compensated signal drives a power amplifier which operates the actuator.

In operation, the sensor will detect the beginning of a motion of the structure at the actuator point. The amplified signal from the sensor will cause the actuator to move in a direction to suppress the motion and will move the seismic mass to absorb the energy causing the structural motion. The distance that the actuator must move is a function of the size of the seismic mass and the energy tending to move the structure. Thus, the larger the mass, the smaller the actuator stroke will be. Advantageously, a relatively small mass can be used with a long stroke of the actuator. Thus, the system effectively amplifies the mass to produce the damping effect of a much larger mass.

In addition to the motion sensor, a position sensor may be included which measures the displacement of the mass relative to the structure. A signal from the position sensor is fed back to the actuator control. This provides a low frequency feedback loop to maintain centering of the actuator. The design of this loop is not critical since only approximate centering is needed.

It is therefore a principal object of my invention to provide an active vibration suppressor utilizing an amplified mass.

It is another object of my invention to provide a vibration suppressor in which the effect of the seismic mass is amplified by means of a servo system.

It is still another object of my invention to provide a dynamic vibration suppressor for commercial buildings and similar structures which does not require major structural alterations to such structures.

It is yet another object of my invention to provide a dynamic vibration suppressor suitable for buildings and other structures which utilizes a sensor for sensing motion of the structure, an amplifier for amplifying signals from the sensor, an actuator attached to the structure adjacent to sensor and a seismic mass attached to the structure through the actuator.

It is a further object of my invention to provide an actuator having a position sensor in a feedback connection for maintaining centering of the actuator.

These and other objects and advantages of the invention will become apparent from the following detailed description when read in conjunction with the drawings.

DETAILED DESCRIPTION OF THE PREFERRED EMBODIMENT

Figure 1:
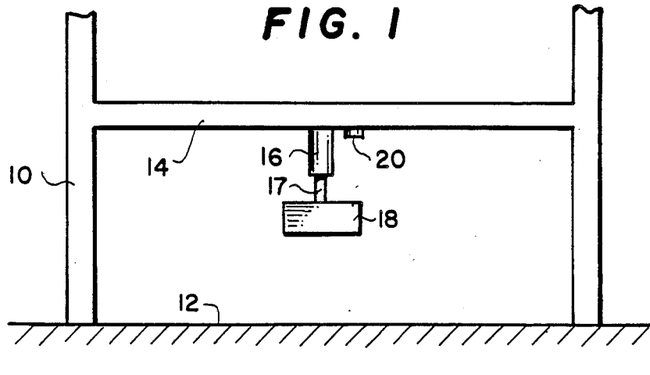
FIG. 1 is a simplified schematic diagram of a building structure having the active vibration suppressor installed therein.

Referring to FIG. 1, a schematic diagram of a building, such as a commercial building, is shown attached to a foundation surface 12. It is to be understood that a building is shown for explanatory puposes only and that the invention is suitable for any type of structure which may experience unwanted vibration. A floor 14 is supported by walls 10. In many commercial buildings, it is common for vibration of floor 14 to occur from machinery, vehicles, external sources such as traffic, trains and the like. In accordance with my invention, I have shown a simplified example of my active vibration suppressor in FIG. 1. A linear actuator 16, which may be hydraulic, pneumatic or electrical, is attached to the structure preferably at a point of maximum deflection; in this example, to the floor 14. The actuator incudes an extendable rod 17 having a seismic mass attached thereto. As will be noted in the figure, seismic mass 18 is free to move as actuator 16 is energized and is attached to the floor 14 only through the actuator 16. A linear accelerometer 20 is attached to the floor 14 adjacent the actuator 16. Accelerometer 20 is utilized to sense any motion of the building structure appearing in floor 14.

Although a generalized linear actuator and accelerometer are shown hereinabove, it is to be understood that any type of actuator such as an electric or pneumatic actuator can be used to practice my invention. Similarly, any type of sensor which will produce a measurement of motion is suitable, such as accelerometers, tachometers, and other velocity transducers. Potentiometers, resolvers, synchros, or other position transducers are suitable for measuring position. When the structural system involves rotating structures, rotary actuators, angular velocity transducers and position transducers may be utilized.

Figure 1A:
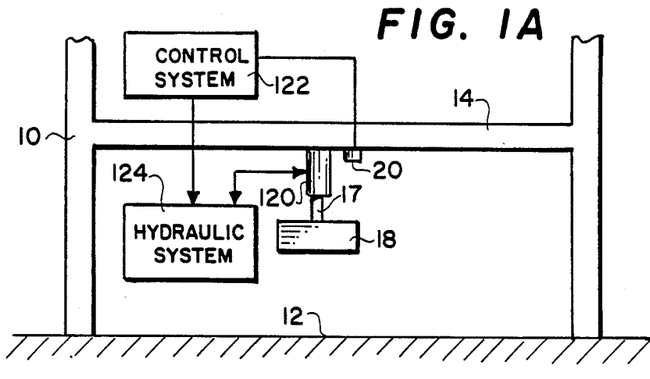
FIG. 1A shows a simplified schematic diagram of the vibration suppressor of FIG. 1 in which a hydraulic actuator is shown with a control system and hydraulic system.
Figure 1B:
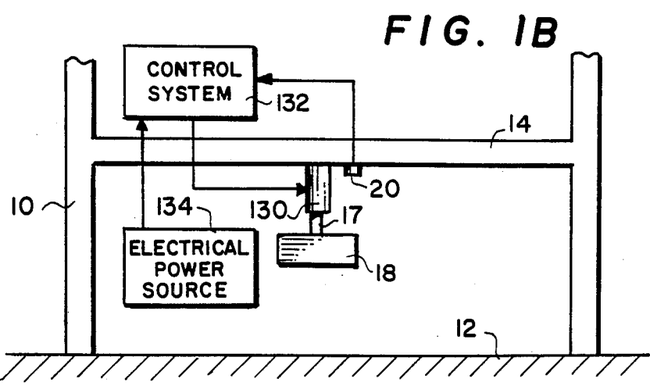
FIG. 1B shows a simplified schematic diagram of the vibration suppressor of FIG. 1 having an electrical actuator, a control system and an electrical power source.
Figure 1C:
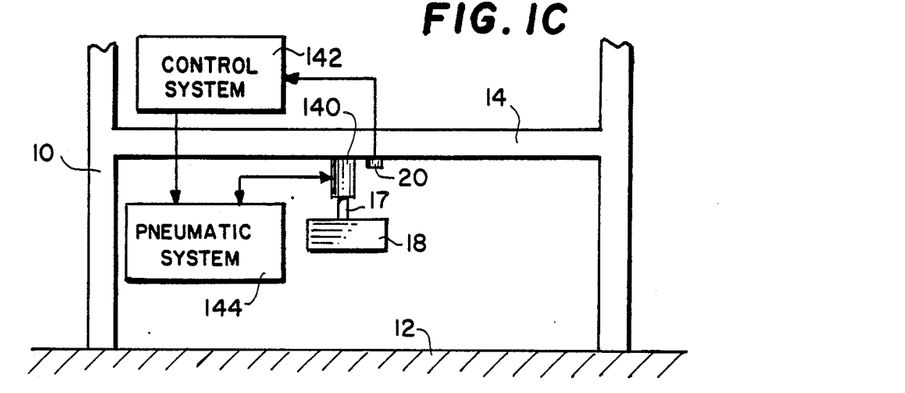
FIG. 1C shows a simplified schematic diagram of the suppressor shown in FIG. 1 using a pneumatic actuator and showing a control system and pneumatic system.

Specific linear actuators are shown in the simplified schematic diagrams of FIGS. 1A, 1B, and 1C. In FIG. 1A, a linear hydraulic actuator 120 is shown with accelerometer 20 having its output directed to a control system 122 which controls hydraulic system 124 to operate actuator 120 in response to the signals from accelerometer 120. Similarly in FIG. 1B, another specific type of linear actuator is shown in which electrical actuator 130 is controlled by control system 132 responsive to accelerometer 20. An electrical power source 134 is shown.

In FIG. 1C a linear pneumatic actuator 140 is illustrated having a pneumatic system 144 which is operated responsive to signals from control system 142 which receives signals from accelerometer 20.

Figure 1D:
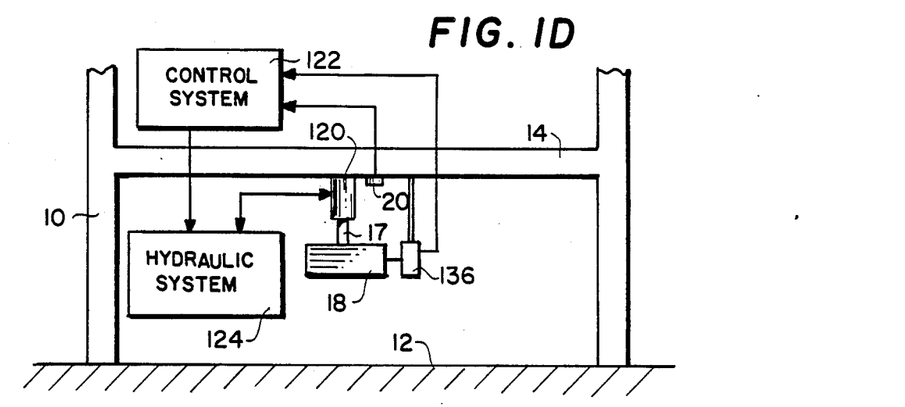
FIG. 1D shows the device of FIG. 1A which includes a position sensor.
Figure 1E:
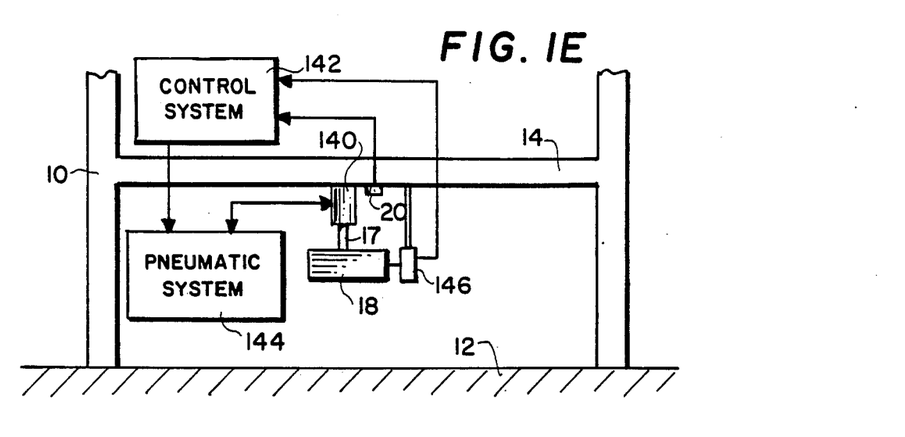
FIG. 1E shows the device of FIG. 1C which includes a position sensor.

FIGS. 1D and 1E show the addition of position sensors which sense the instantaneous position of mass 18. For example, sensor 136 in FIG. 1D provides a signal to the control system 122 which can be used to center actuator 120 when no vibration is being experienced by accelerometer 20 as will be discussed hereinbelow.

Although the active vibration suppressor of the invention has been discussed above as applied to a building, there are many other structures that can benefit from the invention. Certain vehicles which are subject to vibrations can be constructed of lighter materials and stiffened by use of the invention. A particular application involves large space structures such as steerable antennas which need a high degree of stiffness and freedom from vibration, yet must necessarily be constructed with a minimum of material. The active vibration system of the invention can produce the required stiffness using linear electrical transducers powered from solar batteries.

In the example shown in FIG. 1, the output from the accelerometer 20 is amplifed and compensated so as to drive a servo type amplifier for operation of the actuator 16.

Figure 2:
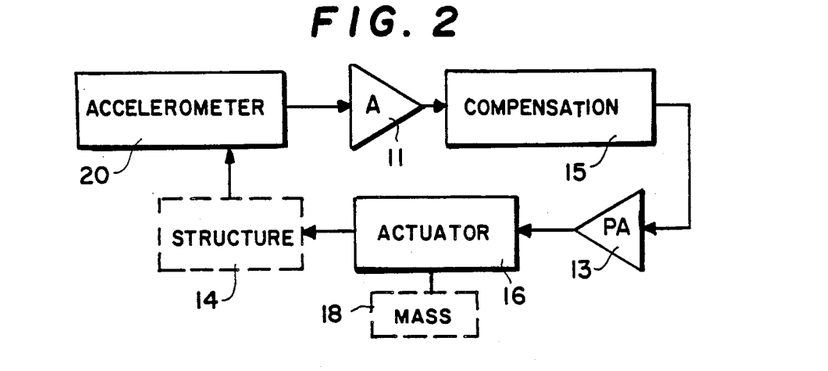
FIG. 2 is a simplified block diagram of the installation of FIG. 1.

The operation of the system of FIG. 1 may thus be understood with reference to FIG. 2 which is a simplified block diagram of the installation. In operation, structure 14 when set in motion will vibrate at a certain frequency or frequencies and will generate an output from accelerometer 20. This output is of course proportional to the acceleration of the structure. An amplifier 11, in this example an electronic amplifier, amplifies the signal from accelerometer 20 and is compensated to properly phase the motion of actuator 16 by compensation circuit 15. The output from compensation circuit 15 drives a power amplifier 13 which provides energy to actuator 16. As will be understood, when a hydraulic actuator is utilized, power amplifier 13 would include the necessary hydraulic system. Actuator 16 will cause mass 18 to move in accordance with the waveform output from power amplifier 13 to actuator 16. Thus, the inertia of mass 18, in effect amplified by the system, will be transferred to the structure 14 in phase opposition to the vibration thereof and will dampen such vibrations. As will be recognized, mass 18 may be relatively small but will be moved for a greater distance than the displacement of structure 14. Thus, the size of mass 18 will be selected in accordance with the stroke of linear actuator 16.

As mentioned above, FIG. 1 is simplified for explanatory purposes. Where actuator 16 is a hydraulic type, it would normally use a differential pressure transducer to damp the oil spring vibration mode, and would use a position transducer to close an inner low frequency position loop around actuator 16. The position loop would have low gain and would be used to keep the actuator centered. Any suitable type of linear transducer may be used to measure the position of the actuator rod relative to the housing.

Figure 3:
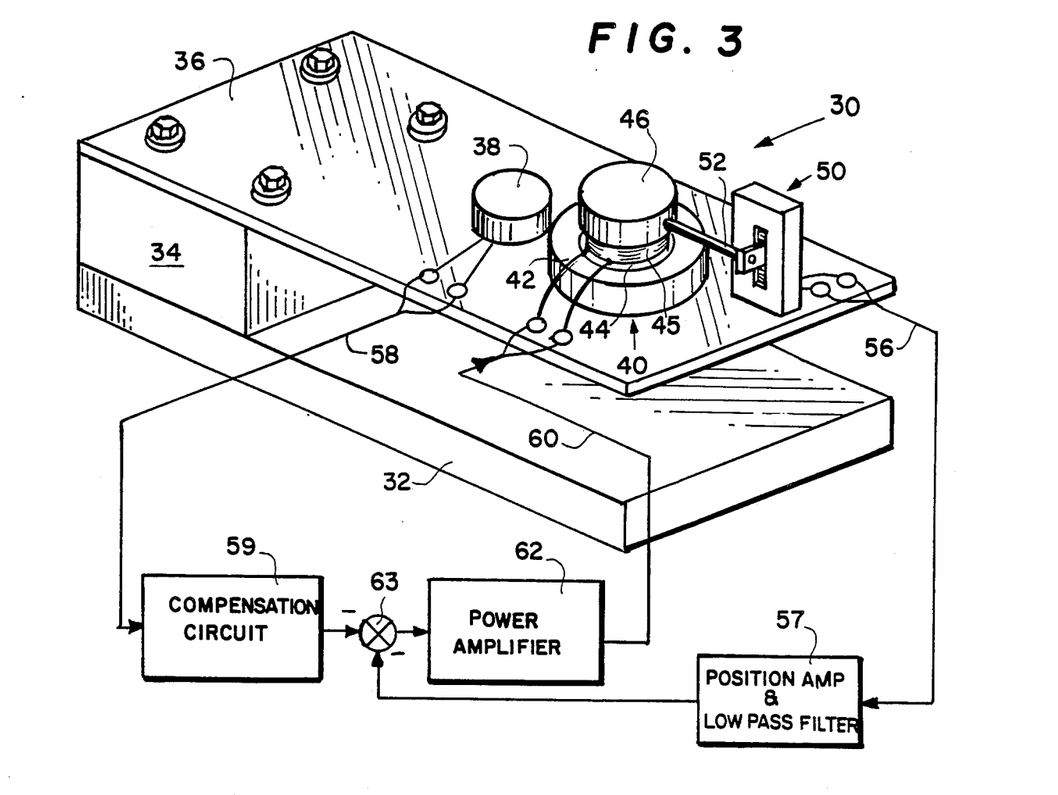
FIG. 3 is a perspective view of a laboratory model of the invention.

Turning now to FIG. 3, a physical embodiment 30 of my invention is shown. The device is a prototype laboratory model used to verify the operation of the invention. A heavy base 32 is provided to simulate the foundation of a building. A cantilevered plate 36 is mounted to base 32 by block 34. Plate 36 is formed from brass, steel, aluminum or other similar material. Plate 36 can be set into vibratory motion by pushing down on the free end and allowing it to vibrate. Near the outer end of plate 36, an electrical linear actuator 40 is attached thereto. Actuator 40 is a dynamic speaker type mechanism having a circular field magnet 42 with a pole piece (not shown) providing a cylindrical gap between the magnet 42 and the pole piece. A voice coil 45 is suspended within this gap by a spider 44. At the other end of voice coil 44, a small metal mass 46 is mounted. Adjacent to the electrical transducer 40 is a sensor 38 which, in the example shown, is an accelerometer. Also shown is a position sensor 50 which senses the position of mass 46 relative to the plate 36. Position sensor 50 is coupled to mass 46 by a small rod 52 which operates a linear potentiometer 54. Thus, as mass 46 moves vertically, potentiometer 54 will be varied. The sensor 38, actuator 40 and position sensor 50 are shown connected to a simplified block diagram of the remainder of the system. Accelerometer 38 is connected via lead 58 to compensation circuit 59 which compensates and amplifies the signal therefrom. The output from compensation circuit 59 drives power amplifier 62 via a summing point 63, with the output from power amplifier 62 energizing the electrical transducer 40 via lead 60. Position sensor 50 supplies a signal proportional to the distance of mass 46 from plate 36 via lead 56 and position amplifier 57 to summing point 63. Amplifier 57 includes a low pass filter below the frequency of vibration of the structure 30. As is conventional, the system gains are adjusted such that when there is no movement of plate 36, the position control system centers voice coil 44 in the gap of field magnet 42.

Figure 4:
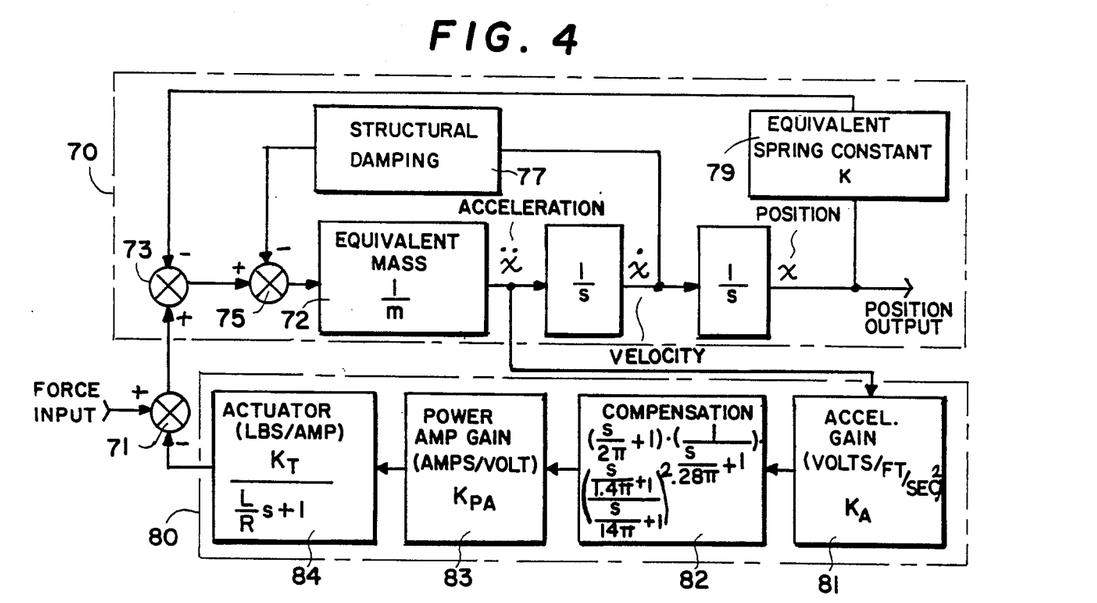
FIG. 4 is a functional block diagram of the system shown in FIG. 3.

A more detailed equivalent circuit of the demonstration unit of FIG. 3 is shown in FIG. 4 in which the position loop is omitted for simplicity. Block 70 represents the device 30 and block 80 represents the structure added by the invention. A force input is applied to a summing point 71, 73 and 75 to set equivalent mass 72 in motion via summing point. Mass 72 will move with an acceleration $X_1(t)$, a velocity $X_2(t)$, and a position $X_3(t)$. The natural structural damping 77 of the system will oppose the velocity while the equivalent spring constant 79 of the system will oppose the change of position.

In the example shown in FIG. 3, the acceleration is sensed, although it will be understood that velocity or position may also be used in accordance with the invention. The acceleration measuring portion of the system will have a given acceleration gain $K_A$. Compensation circuit 82 has the frequency characteristics indicated and will therefore accordingly modify the amplitude and phase of the output from the acceleration sensor and will apply the compensated signal to power amplifier 83 having a gain $K_{PA}$. This output drives the actuator 84 whose movement is in a direction to oppose the force input at summing point 71. The actuator may have mechanical parameters as indicated in the diagram. As will now be seen, the vibration suppression device of the invention in effect provides additional damping in addition to the structural damping and equivalent spring constant of the system in which the nature and amount of damping can be accurately controlled without modification of the structure.

To demonstrate the operation of the system, plate 36 is set into motion by a force applied to the cantileverd end thereof which may be done with the amplifier systems turned off. The frequencies and amplitudes of vibration of plate 36 may then be measured and recorded as is conventional. After the vibration has ceased, the active vibration suppression system of the invention is energized and the same force is then applied to plate 36. The resulting motion of the plate may then be measured and recorded and compared to the undamped measurements.

Figure 5:
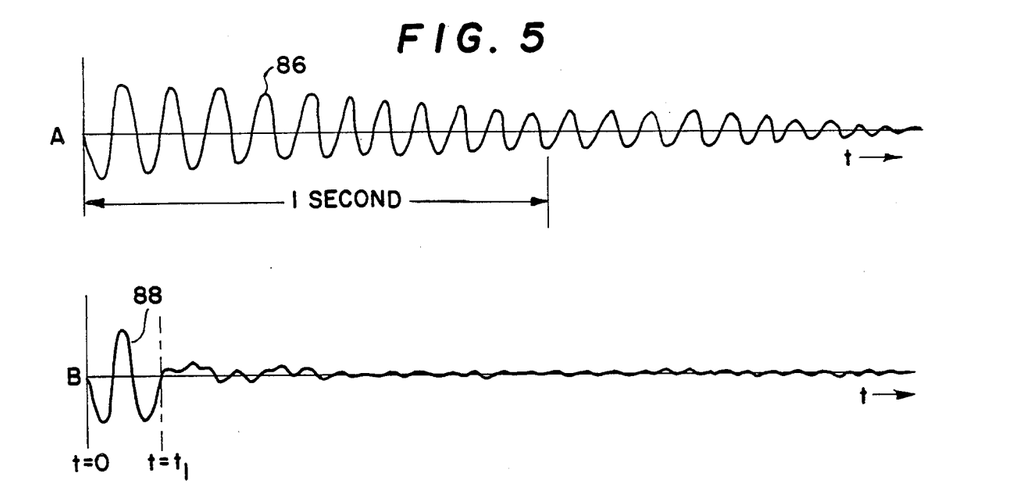
FIG. 5 is a waveform recording of the vibration of the model for open loop and closed loop operation.

The results of a test on the model of FIG. 3 are shown in FIG. 5. Line A represents a recording of the output of accelerometer 38 upon striking plate 36 with the finger without the apparatus of the invention connected. The fundamental mode of vibration 86 has a frequency of about 11 Hz. Analysis of the waveform indicated that a number of higher order modes are also present. Due to the natural damping of the model, the vibration dampens out in several seconds.

With the active vibration suppressor of the invention connected, the result for the same disturbance is represented in line B. The first one and one-half cycle 88 is the undamped response. When the suppressor is energized at $t=t_1$, the maximum deflection is limited to about one-third of the undamped deflection as seen at 87. The vibration dampens out in about one-third second.

Figure 6:
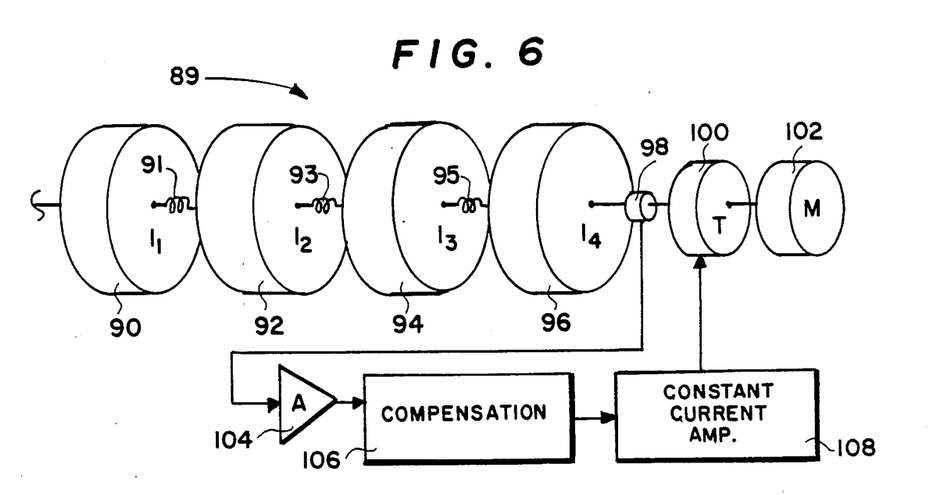
FIG. 6 is a simplified schematic diagram of a rotational structure having the active vibration suppressor installed thereon.

The example of the invention above is for a system having a linear displacement. However, the active vibration suppressor is equally applicable to angular displacements. Turning to FIG. 6, an application to a rotational system 89 is shown in schematic form. Four inertial elements $I_1$ (90), $I_2$ (92), $I_3$ (94) and $I_4$ (96) are coupled together by torsional springs 91, 93 and 95.

An electric torquer motor 100 is coupled to the system via an angular accelereometer 98. Torquer motor 100 produces a torque proportioal to the armature current and independent of the rotational speed thereof or the voltage across the motor. Such devices are well known in the art. As will be recognized, a wideband amplifier may be provided to drive motor 100 which will produce a constant current proportional to the voltage into the amplifier. A seismic mass 102 is coupled to motor 100. The output from accelerometer 98 is amplified by amplfier 104 and compensation network 106. This output drives constant current amplifier 108 which operates motor 100.

When the system 89 is rotating at constant speed, any angular vibration will produce an output from accelerometer 98 causing motor 100 to produce a torque opposing the vibrational rotation by means of mass 102.

Figure 7:
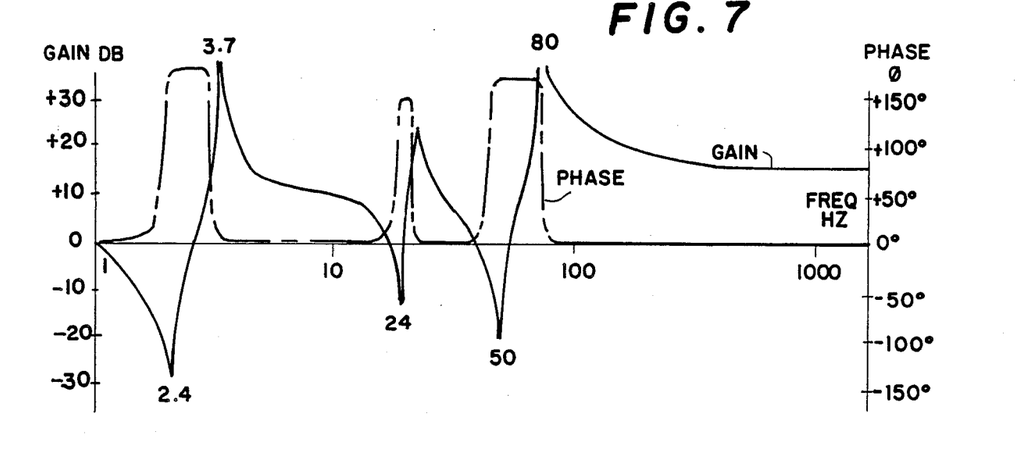
FIG. 7 is a graph of the open loop transfer function of the system of FIG. 5 without compensation.

A computer model of system 89 has been developed and the transfer function calculated using a structural analysis program of the NASTRAN type. FIG. 7 shows the torque to acceleration transfer function of the three masses 92, 94 and 96 as measured by angular accelerometer 98. This result is open loop with no compensation.

Figure 8:
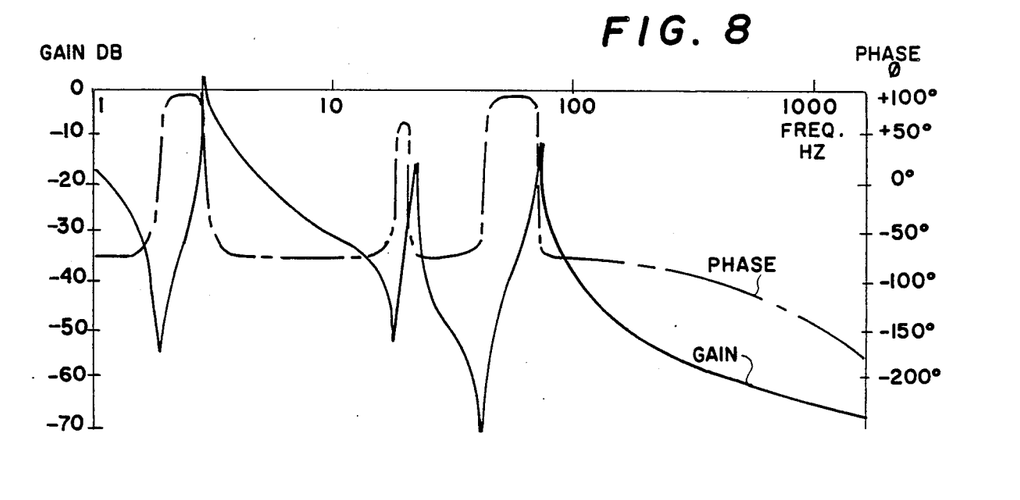
FIG. 8 is a graph of the open loop transfer function of the system of FIG. 5 with a compensation network included therein.

A low frequency lag compensation network with a bandwidth of 1.0 rad/sec was placed in the loop and the open loop transfer function for this network calculated as shown in FIG. 8. Assuming that the amplifier and torquer motor bandwidth was 4000 Hz, the closed loop frequency response for a loop gain of 46 dB is shown in FIG. 8. The closed loop system was stable up to a gain of 70 dB. This limit could be increased by increasing the amplifier and motor bandwidth. It was assumed that the accelerometer bandwidth was much greater than that of the motor and amplifier.

Figure 9:
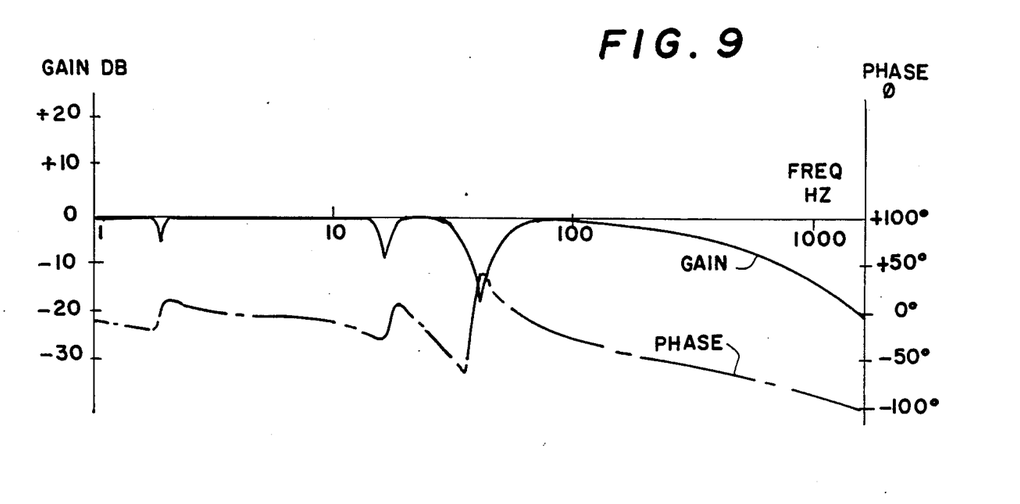
FIG. 9 is a graph of the closed loop transfer function of the system of FIG. 5.

As will be noted from FIG. 9, all of the resonances were well damped. At the noted gain, the damping ratio of all resonances was increased to nearly 1.0.

System 89 was simplified for clarity of analysis. In an actual system, there will be higher frequency modes which must be kept stable. However, the vibration amplitudes normally become smaller as the frequency increases and these modes eventually limit the closed loop gain. At the 180 degree phase crossover of the combined actuator and sensor, the mode gains must be less than 0 dB for stability. If a system presents a problem at this point, a notch filter may be used to attentuate a resonant peak.

The relationship of the actuator stroke, the seismic mass, the frequency of excitation, and the maximum actuator force required for a linear displacement system may be determined from the following equation:

$$F = 2\pi fmx$$

where
m = mass of seismic mass
x = ½ of actuator displacement
f = frequency
F = maximum force From this relationship, it may be noted that the maximum force from the actuator stroke may be increased by increasing either the stroke or the seismic mass. For a given design, a tradeoff must be made considering power demands of the actuator, size of the mass, space constraints and type of structure.

As is well known, the maximum force of a hydraulic actuator is controlled by the oil pressure and the piston area. For an electric torquer motor, the torque is directly proportional to the armature current and the torque constant of the motor. To determine the maximum force required for an installation, the structural impedance and the disturbance as functions of frequency may be calculated or measured. Computer programs such as NASTRAN are available to aid in calculation of structural impedance and transfer function, and the disturbance may be measured with sensors such as accelerometers.

Although specific examples have been described for explanatory purposes, it will be clear that many variations in design may be made without departing from the spirit and scope of the invention.

I claim:

1. A system for suppressing vibrations in an elongate building structure and the like comprising:
    a seismic mass;
    actuator means attached to said structure and to said seismic mass for moving said mass in a direction at right angles to said elongate structure;
    vibration sensor means attached to said structure for producing control signals representative of lateral movement thereof; and
    control means connected to said actuator means and said sensor means, said control means responsive to said control signals to cause said actuator means to move said seismic mass in a direction to oppose such movement of said structure.

2. The system as recited in claim 1 in which said actuator means is a linear actuator.

3. The system as recited in claim 2 in which said linear actuator is hydraulically operated.

4. The system as recited in claim 2 in which said linear actuator is electrically operated.

5. The system as recited in claim 1 in which said linear actuator is pneumatically operated.

6. The system as recited in claim 1 in which said actuator means is an electrical torquer motor.

7. The system as recited in claim 1 in which said sensor means is a linear accelerometer.

8. The system as recited in claim 1 in which said sensor means is an angular accelerometer.

9. The system as recited in claim 1 in which said control means includes a compensation circuit and a power amplifier circuit.

10. The system as recited in claim 1 which further includes position sensing means for producing signals representative of the position of said seismic mass with respect to said structure.

11. The system as recited in claim 9 in which said position sensing means produces electrical signals.

12. The system as recited in claim 9 in which said position sensing means produces hydraulic control signals.

13. The system as recited in claim 9 in which said position sensing means produces pneumatic control signals.

14. The system as recited in claim 1 in which said sensor means is a velocity sensor.

15. The system as recited in claim 1 in which said sensor means is a displacement sensor.

16. A closed loop system for damping vibrations in an elongate building structure and the like comprising:
    an acutator attached to said structure at a point of lateral displacement of said structure and having a movable member;
    a seismic mass attached to said movable member of said actuator;
    an accelerometer attached to said structure adjacent said actuator;
    a compensation circuit connected to said accelerometer for receiving output signals therefrom; and
    a power amplifier connected to said compensation circuit for receiving compensated output signals therefrom, said amplifier having an output operatively connected to said actuator for causing said seismic mass to move in a direction to oppose displacement of said structure.

17. The system as recited in claim 16 in which said displacement of said structure is linear and said actuator is a linear actuator.

18. The system as recited in claim 16 which further comprises:
    a position sensor connected between said seismic mass and said structure;
    a position amplifier having an input connected to said position snesor and an output; and
    a summing point disposed between said compensation circuit and said power amplifier and having an input connected to said output of said position amplifier with a polarity and bandpass selected to produce a negative feedback loop to maintain a preselected average position of said transducer movable member.

19. A method for damping vibrations in an elongate building structure comprising the steps of:
    attaching an acutator to the structure at an area of vibration;
    attaching a seismic mass to the actuator;
    sensing lateral displacement of the structure at the area of attachment of the actuator;

producing a control signal representative of the displacement;

processing the control signal to operate the actuator; and moving the seismic mass in a direction to oppose the displacement.

20. The method as recited in claim 19 in which the processing step includes the steps of compensating the control signal and amplifying the compensated control signal.

21. The method as recited in claim 19 which further comprises the steps of:

sensing the displacement of the seismic mass relative to the structure;

producing a second control signal representative of the mass displacement; and controlling the actuator with the second control signal to maintain the actuator approximately centered.

* * * * *